(12) United States Patent
Opshaug et al.

(10) Patent No.: US 10,644,922 B2
(45) Date of Patent: May 5, 2020

(54) PROTECTED USE OF NAVIGATION AND POSITIONING SIGNAL

(71) Applicant: QUALCOMM Incorporated, San Diego, CA (US)

(72) Inventors: Guttorm Ringstad Opshaug, Redwood City, CA (US); Rayman Wai Pon, Cupertino, CA (US); Jie Wu, San Diego, CA (US); Sven Fischer, Nuremberg (DE); Stephen William Edge, Escondido, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 22 days.

(21) Appl. No.: 16/011,770

(22) Filed: Jun. 19, 2018

(65) Prior Publication Data

US 2019/0319827 A1   Oct. 17, 2019

Related U.S. Application Data

(60) Provisional application No. 62/658,446, filed on Apr. 16, 2018.

(51) Int. Cl.
*H04L 27/26* (2006.01)
*H04W 24/10* (2009.01)
(Continued)

(52) U.S. Cl.
CPC .......... *H04L 27/2662* (2013.01); *G06F 7/584* (2013.01); *H04L 5/0048* (2013.01);
(Continued)

(58) Field of Classification Search
None
See application file for complete search history.

(56) References Cited

U.S. PATENT DOCUMENTS 10,349,372 B2 *   7/2019   Lee
2010/0120447 A1 *  5/2010   Anderson ........... H04W 64/003
                                                455/456.1
(Continued)

FOREIGN PATENT DOCUMENTS

WO        2017184043 A1    10/2017

OTHER PUBLICATIONS

"3rd Generation Partnership Project; Technical Specification Group Radio Access Network; Study on indoor positioning enhancements for UTRA and LTE (Release 13)", 3GPP Standard; Technical Report; 3GPP TR 37.857, 3rd Generation Partnership Project (3GPP), Mobile Competence Centre, 650, Route Des Lucioles; F-06921 Sophia-Antipolis Cedex, France, vol. RAN WG1, No. V13.1.0, Dec. 7, 2015 (Dec. 7, 2015), pp. 1-82, XP051294349, [retrieved on Dec. 7, 2015], Section 7.1.1.1, pp. 36-41.

(Continued)

*Primary Examiner* — Eunsook Choi
(74) *Attorney, Agent, or Firm* — Kilpatrick Townsend & Stockton, LLP

(57) ABSTRACT

A periodically-transmitted reference signal can have certain proprietary properties to help to help prevent unauthorized detection and utilization of the signal. More specifically, a base station can adjust times at which a reference signal is transmitted and/or a code with which the signal is encoded. These adjustments may be based on an equation or algorithm, which can be shared with particular mobile devices as needed.

34 Claims, 9 Drawing Sheets

(51) Int. Cl.
    *G06F 7/58*         (2006.01)
    *H04L 5/00*        (2006.01)
    *H04W 72/04*     (2009.01)

(52) U.S. Cl.
    CPC ........ *H04W 24/10* (2013.01); *H04W 72/0426* (2013.01); *H04W 72/0466* (2013.01)

(56) References Cited

U.S. PATENT DOCUMENTS

| | | | |
|---|---|---|---|
| 2014/0370879 A1* | 12/2014 | Redding | H04M 3/42178 |
| | | | 455/419 |
| 2015/0319567 A1* | 11/2015 | Edge | H04W 24/10 |
| | | | 455/436 |
| 2016/0065342 A1* | 3/2016 | Mirbagheri | H04L 5/0048 |
| | | | 370/330 |
| 2019/0037529 A1* | 1/2019 | Edge | H04L 5/005 |

OTHER PUBLICATIONS

International Search Report and Written Opinion—PCT/US2019/019363—ISA/EPO—dated May 20, 2019.
Motorola: "Evaluation of PRS-Assisted OTDOA-based Positioning for LTE" 3GPP Draft; R1-091930, 3rd Generation Partnership Project (3GPP), Mobile Competence Centre, 650, Route Des Lucioles; F-06921 Sophia-Antipolis Cedex, France, vol. RAN WG1, No. San Francisco, USA; Apr. 29, 2009, Apr. 29, 2009 (Apr. 29, 2009), 6 Pages, XP050339411, [retrieved on Apr. 29, 2009], Section 3, "Simulation Results".

* cited by examiner

PROTECTED USE OF NAVIGATION AND POSITIONING SIGNAL

RELATED APPLICATIONS

This application claims the benefit of U.S. Provisional Application No. 62/658,446, filed Apr. 16, 2018, entitled "PROTECTED USE OF 5G NAVIGATION AND POSITIONING SIGNAL", which is assigned to the assignee hereof, and incorporated herein in its entirety by reference.

BACKGROUND

1. Field

The subject matter disclosed herein relates to electronic devices, and more particularly to methods and apparatuses for use to support location of a mobile device using a fifth-generation (5G) wireless network.

2. Information

Obtaining the location or position of a mobile device that is accessing a wireless network may be useful for many applications including, for example, emergency calls, personal navigation, asset tracking, locating a friend or family member, etc. Existing position methods include methods based on measuring radio signals transmitted from a variety of devices including satellite vehicles (SVs) and terrestrial radio sources in a wireless network such as base stations and access points. It is expected that standardization for new fifth-generation (5G) wireless networks will include support for various positioning methods, which may utilize reference signals transmitted by base stations in a manner similar to which Long-Term Evolution (LTE) wireless networks currently utilize Positioning Reference Signals (PRS) and/or Cell-specific Reference Signals (CRS) for position determination. Problematically, the transmission of these signals in a predictable manner may make proprietary base station information (e.g., determining base station ID and location) easily determinable.

SUMMARY

Embodiments described herein address these and other concerns by making certain properties of a periodically-transmitted reference signal proprietary to help prevent unauthorized detection and utilization of the signal. More specifically, a base station can adjust times at which a reference signal is transmitted and/or a code with which the signal is encoded. These adjustments may be based on an equation or algorithm, which can be shared with particular mobile devices as needed.

An example method of obtaining reference signals with a mobile device in a wireless communication network, according to the description, comprises obtaining, at the mobile device, base station information for a plurality of base stations in the wireless communication network, where the base station information comprising a location and an identifier of each base station of the plurality of base stations. The method further comprises obtaining, with a mobile device, seed information for a base station of the plurality of base stations, and determining, based on the base station information for the base station and the seed information, either or both of a first symbol, selected from a first resource block having a series of successive symbols, designated for transmission of a position measurement signal by the base station during a first positioning occasion, or a first code, selected from a predetermined set of codes, with which the transmission of the position measurement signal by the base station during the first positioning occasion is designated to be encoded. The method also comprises taking a first measurement, with the mobile device, of the position measurement signal based on the determining either or both of the first symbol or the first code.

Embodiments of the method may include one or more of the following features. The seed information may comprise a timestamp indicative of a time for which symbol periods, codes, or both of at least a portion of wireless positioning measurement signals subsequently transmitted by the base station can be determined. Obtaining the seed information may comprise receiving the seed information from the base station. The seed information may comprise initial state information. The determining either or both of the first symbol or the first code may comprise inputting values into a Linear Feedback Shift Register based on the initial state information. The determining either or both of the first symbol or the first code may comprise inputting data from the seed information into an equation and obtaining the either or both of the first symbol or the first code from the equation. The method may further comprise determining, based on the base station information for the base station and the seed information, either or both of a second symbol, selected from a second resource block having a series of successive symbols, designated for transmission of the position measurement signal by the base station during a second positioning occasion, or a second code, selected from the predetermined set of codes, designated for the transmission of the position measurement signal by the base station during the second positioning occasion, and taking a second measurement, with the mobile device, of the position measurement signal based on the determining either or both of the second symbol or the second code. A position of the second symbol within the second resource block may be different than a position of the first symbol within the first resource block. The second code may be different than the first code. Determining the second code may comprise shifting values of at least one Linear Feedback Shift Register a number of times. The method may further comprise determining the number of times to shift the values of the at least one Linear Feedback Shift Register based on an identity of the base station. The method may further comprise determining, with the mobile device, the number of times to shift the values of the at least one Linear Feedback Shift Register for each of a plurality of positioning occasions, wherein the number of times to shift the values of the at least one Linear Feedback Shift Register is different for at least two of the plurality of positioning occasions.

An example device, according to the description, comprises a wireless communication interface, a memory, and a processing unit communicatively coupled with the wireless communication interface and the memory. The processing unit is configured to obtain base station information for a plurality of base stations in the wireless communication network, where the base station information comprises a location and an identifier of each base station of the plurality of base stations. The processing unit is further configured to obtain seed information for a base station of the plurality of base stations and determine, based on the base station information for the base station and the seed information, either or both of a first symbol, selected from a first resource block having a series of successive symbols, designated for transmission of a position measurement signal by the base station during a first positioning occasion, or a first code, selected from a predetermined set of codes, with which the transmission of the position measurement signal by the base station during the first positioning occasion is designated to be encoded. The processing unit is also configured to take a first measurement, using the wireless communication interface, of the position measurement signal based on the determining either or both of the first symbol or the first code.

Embodiments of the device may further comprise one or more of the following features. The processing unit may be configured to obtain, from the seed information, a timestamp indicative of a time for which symbol periods, codes, or both of at least a portion of wireless positioning measurement signals subsequently transmitted by the base station can be determined. The processing unit may be configured to obtain the seed information at least in part by receiving the seed information from the base station. The processing unit may be processing unit is configured to determine, using the seed information, initial state information. The processing unit may be configured to determine either or both of the first symbol or the first code at least in part by inputting values into a Linear Feedback Shift Register based on the initial state information. The processing unit may be configured to determine either or both of the first symbol or the first code at least in part by inputting data from the seed information into an equation and obtaining the either or both of the first symbol or the first code from the equation. The processing unit may be configured to determine, based on the base station information for the base station and the seed information, either or both of a second symbol, selected from a second resource block having a series of successive symbols, designated for transmission of the position measurement signal by the base station during a second positioning occasion, or a second code, selected from the predetermined set of codes, designated for the transmission of the position measurement signal by the base station during the second positioning occasion, and take a second measurement, using the wireless communication interface, of the position measurement signal based on the determining either or both of the second symbol or the second code. The processing unit may be to determine the second code at least in part by shifting values of at least one Linear Feedback Shift Register a number of times. The processing unit may be further configured to determine the number of times to shift the values of the at least one Linear Feedback Shift Register based on an identity of the base station. The processing unit may be further configured to determine the number of times to shift the values of the at least one Linear Feedback Shift Register for each of a plurality of positioning occasions, wherein the number of times to shift the values of the at least one Linear Feedback Shift Register is different for at least two of the plurality of positioning occasions.

An example mobile device, according to the description, comprises means for obtaining base station information for a plurality of base stations in the wireless communication network, where the base station information comprises a location and an identifier of each base station of the plurality of base stations. The mobile device may further comprise means for obtaining seed information for a base station of the plurality of base stations, and means for determining, based on the base station information for the base station and the seed information, either or both of a first symbol, selected from a first resource block having a series of successive symbols, designated for transmission of a position measurement signal by the base station during a first positioning occasion, or a first code, selected from a predetermined set of codes, with which the transmission of the position measurement signal by the base station during the first positioning occasion is designated to be encoded. The mobile device may further comprise means for taking a first measurement of the position measurement signal based on the determining either or both of the first symbol or the first code.

Embodiments of the mobile device may include one or more of the following features. The means for obtaining the seed information may comprise means for receiving the seed information from the base station. The means for determining either or both of the first symbol or the first code may comprise means for inputting values into a Linear Feedback Shift Register based on the initial state information. The means for determining either or both of the first symbol or the first code may comprise means for inputting data from the seed information into an equation and obtaining the either or both of the first symbol or the first code from the equation. The mobile device may further comprise means for determining, based on the base station information for the base station and the seed information, either or both of: a second symbol, selected from a second resource block having a series of successive symbols, designated for transmission of the position measurement signal by the base station during a second positioning occasion, or a second code, selected from the predetermined set of codes, designated for the transmission of the position measurement signal by the base station during the second positioning occasion, and means for taking a second measurement, with the mobile device, of the position measurement signal based on the determining either or both of the second symbol or the second code. The means for determining the second code may comprise means for shifting values of at least one Linear Feedback Shift Register a number of times. The mobile device may further comprise means for determining the number of times to shift the values of the at least one Linear Feedback Shift Register based on an identity of the base station. The mobile device may further comprise means for determining the number of times to shift the values of the at least one Linear Feedback Shift Register for each of a plurality of positioning occasions, wherein the number of times to shift the values of the at least one Linear Feedback Shift Register is different for at least two of the plurality of positioning occasions.

An example non-transitory, computer-readable medium, according to the description, has instructions embedded thereon for causing a mobile device to obtain reference signals a wireless communication network. The instructions include computer code for obtaining base station information for a plurality of base stations in the wireless communication network, the base station information comprising a location and an identifier of each base station of the plurality of base stations, obtaining seed information for a base station of the plurality of base stations, and determining, based on the base station information for the base station and the seed information, either or both of a first symbol, selected from a first resource block having a series of successive symbols, designated for transmission of a position measurement signal by the base station during a first positioning occasion, or a first code, selected from a predetermined set of codes, with which the transmission of the position measurement signal by the base station during the first positioning occasion is designated to be encoded. The instructions also include computer code for taking a first measurement of the position measurement signal based on the determining either or both of the first symbol or the first code.

An example method of transmitting reference signals from a base station of a wireless communication network, according to the description, comprises transmitting a position measurement signal during a first positioning occasion, where the position measurement signal is transmitted during a first symbol of a first resource block having a series of successive symbols, and the position measurement signal is encoded with a first code of a predetermined set of codes. The method further includes transmitting the position measurement signal during a second positioning occasion, where the position measurement signal is transmitted during a second symbol of a second resource block having a series of successive symbols, and the position measurement signal is encoded with a second code of the predetermined set of codes. Additionally, the second symbol has a different order, within the second resource block, than an order of the first symbol within the first resource block, or the second code is different than the first code, or both.

An example base station, according to the description, comprises a wireless communication interface, a memory, and a processing unit communicatively coupled with the wireless communication interface and the memory. The processing unit is configured to transmit a position measurement signal, using the wireless communication interface, during a first positioning occasion, wherein the position measurement signal is transmitted during a first symbol of a first resource block having a series of successive symbols, and the position measurement signal is encoded with a first code of a predetermined set of codes. The processing unit is further configured to transmit the position measurement signal, using the wireless communication interface, during a second positioning occasion, wherein the position measurement signal is transmitted during a second symbol of a second resource block having a series of successive symbols, and the position measurement signal is encoded with a second code of the predetermined set of codes. Furthermore the second symbol has a different order, within the second resource block, than an order of the first symbol within the first resource block, or the second code is different than the first code, or both.

An example device, according to the description, comprises means for transmitting a position measurement signal during a first positioning occasion, where the position measurement signal is transmitted during a first symbol of a first resource block having a series of successive symbols, and the position measurement signal is encoded with a first code of a predetermined set of codes. The device also comprises means for transmitting the position measurement signal during a second positioning occasion, where the position measurement signal is transmitted during a second symbol of a second resource block having a series of successive symbols, and the position measurement signal is encoded with a second code of the predetermined set of codes. Further, the second symbol has a different order, within the second resource block, than an order of the first symbol within the first resource block, or the second code is different than the first code, or both.

An example non-transitory, computer-readable medium, according to the description, has instructions embedded thereon for causing a base station of a wireless communication network to transmit reference signals. The instructions include computer code for transmitting a position measurement signal during a first positioning occasion, where the position measurement signal is transmitted during a first symbol of a first resource block having a series of successive symbols, and the position measurement signal is encoded with a first code of a predetermined set of codes. The instructions further include transmitting the position measurement signal during a second positioning occasion, where the position measurement signal is transmitted during a second symbol of a second resource block having a series of successive symbols, and the position measurement signal is encoded with a second code of the predetermined set of codes. The second symbol has a different order, within the second resource block, than an order of the first symbol within the first resource block, or the second code is different than the first code, or both.

BRIEF DESCRIPTION OF DRAWINGS

Non-limiting and non-exhaustive aspects are described with reference to the following figures.

Figure 1:
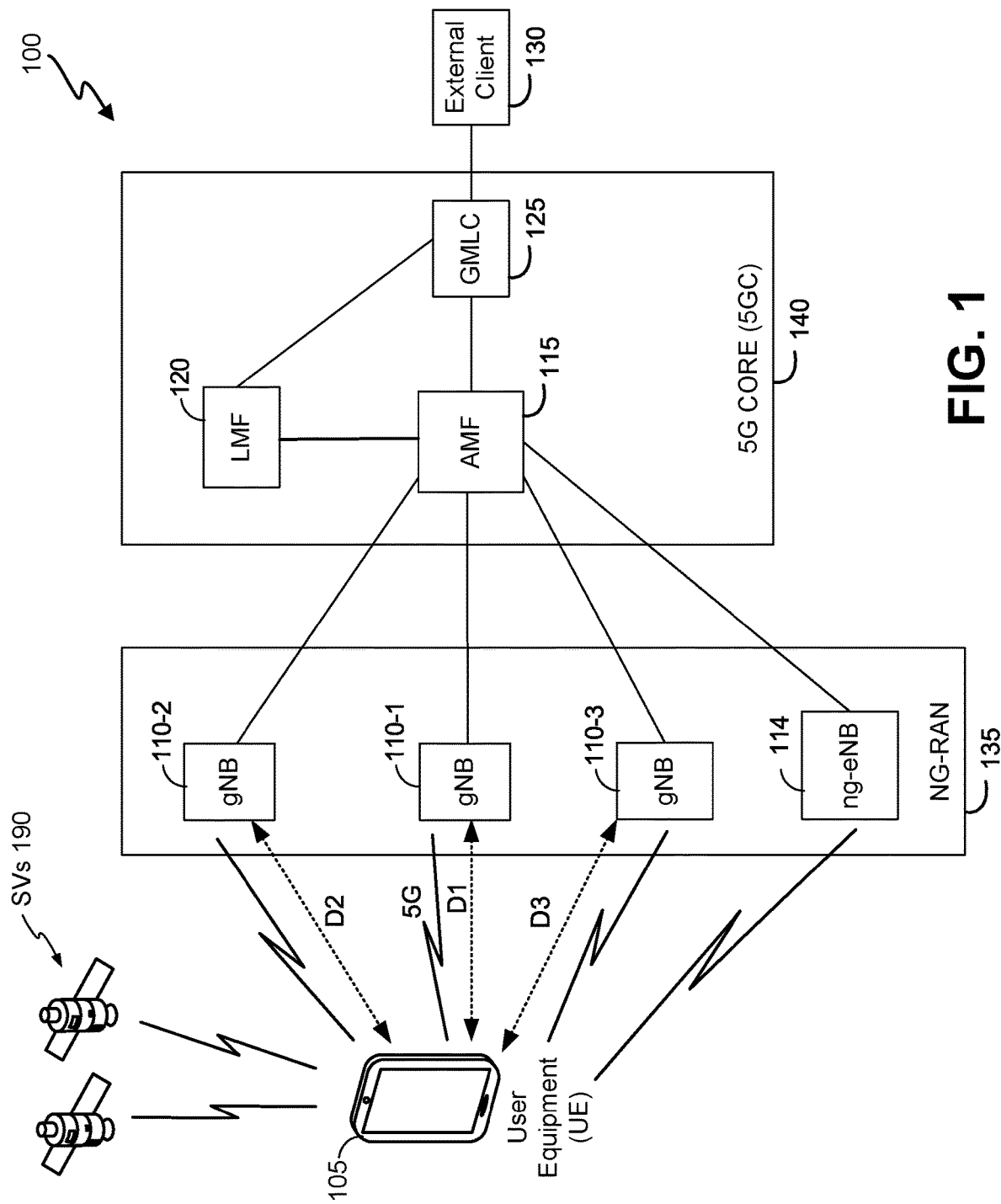
FIG. 1 is a diagram of a communication system that may utilize a 5G network to determine a position for a user equipment (UE), according to an embodiment.

Like reference numbers and symbols in the various figures indicate like elements, in accordance with certain example implementations. In addition, multiple instances of an element may be indicated by following a first number for the element with a hyphen and a second number. For example, multiple instances of an element 110 may be indicated as 110-1, 110-2, 110-3 etc. When referring to such an element using only the first number, any instance of the element is to be understood (e.g., elements 110 in the previous example would refer to elements 110-1, 110-2 and 110-3).

DETAILED DESCRIPTION

Some example techniques for determining the location of a user equipment (UE) are presented herein, which may be implemented at the UE (e.g., a mobile device or mobile station), a location server (LS), a base station, and/or other devices. These techniques can be utilized in a variety of applications utilizing various technologies and/or standards, including 3rd Generation Partnership Project (3GPP), Open Mobile Alliance (OMA), 3GPP Long Term Evolution (LTE) Positioning Protocol (LPP) and/or OMA LPP Extensions (LPPe), Wi-Fi®, Global Navigation Satellite System (GNSS), and the like.

A User Equipment (UE) may comprise a mobile device such as, a mobile phone, smartphone, tablet or other mobile computer, a portable gaming device, a personal media player, a personal navigation device, a wearable device, an in-vehicle device, or other electronic device. Position determination of a UE can be useful to the UE and/or other entities in a wide variety of scenarios, including during navigation (e.g., via a navigation application executed by the UE), emergency response (e.g., E 911), and so forth. Positioning of a UE may be done by satellite-based means (e.g., Global Positioning System (GPS)) or terrestrial means.

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques require the location server to calculate the position of the UE, rather than the UE itself, these positioning techniques are not frequently used in applications such as car or cell phone navigation, which instead typically rely on satellite-based positioning.

One obstacle to the widespread adoption of positioning using cellular networks is access to the known locations of the base stations (typically stored in what is called a Based Station Almanac (BSA)) by the UE. Even if an encrypted form of the BSA could be provided to UEs to allow the UE used to determine their own location based on measurements of reference signals, the transmission of these signals by base stations make this information potentially accessible to crowd-sourcing or war-driving, essentially, enabling a BSA to be generated based on, in-the-field observations.

Embodiments described herein address these and other concerns by making certain properties of a periodically-transmitted reference signal proprietary. More specifically, a base station can adjust times at which the reference signal is transmitted and/or a code with which the signal is encoded. These adjustments may be based on an equation or algorithm, which can be shared with authorized UEs, as needed. Thus, according to embodiments, the equation or algorithm can be encrypted and shared (along with a BSA) with authorized UEs, while deriving the BSA from war-driving or crowd-sourcing with an unauthorized UE would become much more difficult. Moreover, the equation or algorithm could be updated, as desired, to help ensure BSA information remains protected. Moreover, because reference signals for 5G wireless networks are still being defined, the 5G standard may enable these signals to include such protections natively.

It can be noted that, although embodiments described herein utilize a "position measurement signal" in a 5G cellular network, embodiments are not so limited. The embodiments described herein may be applied to other reference signals (including existing reference signals such as PRS, CRS, tracking reference signal (TRS) etc.), and other communication networks. A person of ordinary skill in the art will appreciate various applications beyond those described herein.

FIG. 1 is a diagram of a communication system 100 that may utilize a 5G network to determine a position a UE 105 using positioning methods (e.g., OTDOA) based the transmission of position measurement signals by base stations, according to an embodiment. Here, the communication system 100 comprises a UE 105 and a 5G network comprising a Next Generation (NG) Radio Access Network (RAN) (NG-RAN) 135 and a 5G Core Network (5GC) 140, which, along with providing UE positioning, may provide data and voice communication to the UE 105. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in 3GPP. Accordingly, NG-RAN 135 and 5GC 140 may conform to current or future standards for 5G support from 3GPP. The communication system 100 may further utilize information from GNSS satellite vehicles (SVs) 190. Additional components of the communication system 100 are described below. It will be understood that a communication system 100 may include additional or alternative components.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the communication system 100. Similarly, the communication system 100 may include a larger (or smaller) number of SVs 190, gNBs 110, ng-eNBs 114, Access and Mobility Management Functions (AMFs) 115, external clients 130, and/or other components. The illustrated connections that connect the various components in the communication system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL) Enabled Terminal (SET), or by some other name. Moreover, as noted above, UE 105 may correspond to any of a variety of devices, including a cellphone, smartphone, laptop, tablet, personal digital assistant (PDA), tracking device, navigation device, Internet of Things (IoT) device, wearable device, embedded modem, automotive or other vehicular computing device, or some other portable or moveable device. Typically, though not necessarily, the UE 105 may support wireless communication using one or more Radio Access Technologies (RATs) such as using Global System for Mobile Communications (GSM), Code Division Multiple Access (CDMA), Wideband CDMA (WCDMA), Long Term Evolution (LTE), High Rate Packet Data (HRPD), IEEE 802.11 Wi-Fi (also referred to as Wi-Fi), Bluetooth® (BT), Worldwide Interoperability for Microwave Access (WiMAX), 5G new radio (NR) (e.g., using the NG-RAN 135 and 5GC 140), etc. The UE 105 may also support wireless communication using a Wireless Local Area Network (WLAN) which may connect to other networks (e.g. the Internet) using a Digital Subscriber Line (DSL) or packet cable for example. The use of one or more of these RATs may enable the UE 105 to communicate with an external client 130 (e.g. via elements of 5GC 140 not shown in FIG. 1 or possibly via Gateway Mobile Location Center (GMLC) 125) and/or enable the external client 130 to receive location information regarding the UE 105 (e.g. via GMLC 125).

The UE 105 may comprise a single entity or may comprise multiple entities such as in a personal area network where a user may employ audio, video and/or data I/O devices and/or body sensors and a separate wireline or wireless modem. An estimate of a location of the UE 105 may be referred to as a location, location estimate, location fix, fix, position, position estimate or position fix, and may be geographic, thus providing location coordinates for the UE 105 (e.g., latitude and longitude) which may or may not include an altitude component (e.g., height above mean sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geographically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geographically, in civic terms, or by reference to a point, area, or volume indicated on a map, floor plan or building plan. In the description contained herein, the use of the term location may comprise any of these variants unless indicated otherwise.

Base stations in the NG-RAN 135 may comprise NR Node Bs which are more typically referred to as gNBs. In FIG. 1, three gNBs are shown: gNBs 110-1, 110-2 and 110-3, which are collectively and generically referred to herein as gNBs 110. However, a typical NG RAN 135 could comprise dozens, hundreds, or even thousands of gNBs 110. Pairs of gNBs 110 in NG-RAN 135 may be connected to one another (not shown in FIG. 1). Access to the 5G network is provided to UE 105 via wireless communication between the UE 105 and one or more of the gNBs 110, which may provide wireless communications access to the 5GC 140 on behalf of the UE 105 using 5G (also referred as NR). In FIG. 1, the serving gNB for UE 105 is assumed to be gNB 110-1, although other gNBs (e.g. gNB 110-2 and/or gNB 110-3) may act as a serving gNB if UE 105 moves to another location or may act as a secondary gNB to provide additional throughout and bandwidth to UE 105.

Base stations (BSs) in the NG-RAN 135 shown in FIG. 1 may also or instead include a next generation evolved Node B, also referred to as an ng-eNB 114. Ng-eNB 114 may be connected to one or more gNBs 110 in NG-RAN 135 (not shown in FIG. 1)—e.g. directly or indirectly via other gNBs 110 and/or other ng-eNBs. An ng-eNB 114 may provide LTE wireless access and/or evolved LTE (eLTE) wireless access to UE 105. Some gNBs 110 (e.g. gNB 110-2) and/or ng-eNB 114 in FIG. 1 may be configured to function as positioning-only beacons which may transmit reference signals (e.g., positioning measurements signals as described herein) and/or may broadcast assistance data to assist positioning of UE 105 but may not receive signals from UE 105 or from other UEs. It is noted that while only one ng-eNB 114 is shown in FIG. 1, the description below sometimes assumes the presence of multiple ng-eNBs 114.

As noted, while FIG. 1 depicts nodes configured to communicate according to 5G communication protocols, nodes configured to communicate according to other communication protocols, such as, for example, an LPP protocol or IEEE 802.11x protocol, may be used. For example, in an Evolved Packet System (EPS) providing LTE wireless access to UE 105, a RAN may comprise an Evolved Universal Mobile Telecommunications System (UMTS) Terrestrial Radio Access Network (E-UTRAN) which may comprise base stations comprising evolved Node Bs (eNBs) supporting LTE wireless access. A core network for EPS may comprise an Evolved Packet Core (EPC). An EPS may then comprise an E-UTRAN plus EPC, where the E-UTRAN corresponds to NG-RAN 135 and the EPC corresponds to 5GC 140 in FIG. 1. The position measurement signals described herein for support of UE 105 positioning may be applicable to such other networks.

The gNBs 110 and ng-eNB 114 can communicate with an AMF 115, which, for positioning functionality, communicates with a Location Management Function (LMF) 120. The AMF 115 may support mobility of the UE 105, including cell change and handover and may participate in supporting a signaling connection to the UE 105 and possibly data and voice bearers for the UE 105. The LMF 120 may support positioning of the UE 105 when UE 105 accesses the NG-RAN 135 and may support position methods such as Observed Time Difference of Arrival (OTDOA) (which can utilize the positioning measurement signals described herein) and others. The LMF 120 may also process location services requests for the UE 105, e.g., received from the AMF 115 or from the GMLC 125. The LMF 120 may be connected to AMF 115 and/or to GMLC 125. It is noted that in some embodiments, at least part of the positioning functionality (including derivation of a UE 105's location) may be performed at the UE 105 (e.g., using signal measurements obtained by UE 105 for position measurement signals transmitted by wireless nodes such as gNBs 110 and ng-eNB 114, and assistance data provided to the UE 105, e.g. by LMF 120).

The Gateway Mobile Location Center (GMLC) 125 may support a location request for the UE 105 received from an external client 130 and may forward such a location request to the AMF 115 for forwarding by the AMF 115 to the LMF 120 or may forward the location request directly to the LMF 120. A location response from the LMF 120 (e.g. containing a location estimate for the UE 105) may be similarly returned to the GMLC 125 either directly or via the AMF 115 and the GMLC 125 may then return the location response (e.g., containing the location estimate) to the external client 130. The GMLC 125 is shown connected to both the AMF 115 and LMF 120 in FIG. 1 though only one of these connections may be supported by 5GC 140 in some implementations.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, in some embodiments, 5GC 140 may be connected to a WLAN using a Non-3GPP InterWorking Function (N3IWF, not shown FIG. 1) in the 5GC 150. For example, the WLAN may support IEEE 802.11 Wi-Fi access for UE 105 and may comprise one or more Wi-Fi APs. Here, the N3IWF may connect to the WLAN and to other elements in the 5GC 150 such as AMF 115. In some other embodiments, both the NG-RAN 135 and the 5GC 140 may be replaced by other RANs and other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an Evolved Serving Mobile Location Center (E-SMLC) in place of the LMF 120 and a GMLC that may be similar to the GMLC 125. In such an EPS, the E-SMLC may send and receive location information to and from the eNBs in the E-UTRAN and may support positioning of UE 105. In these other embodiments, positioning of a UE 105 may be supported in an analogous manner to that described herein for a 5G network with the difference that functions and procedures described herein for gNBs 110, ng-eNB 114, AMF 115 and LMF 120 may, in some cases, apply instead to other network elements such eNBs, Wi-Fi APs, an MME and an E-SMLC.

Position determination of the UE 105 by the communication system 100 typically involves determining a distance between the UE 105 and each of a plurality of base stations 110, 114 (e.g., distances D1, D2, and D3 between the UE 105 and gNBs 110-1, 100-2, and 100-3, respectively), and using trilateration to determine the UE's location. As noted above, to determine these distances, the UE 105 can measure position measurement signals (including those described herein below) transmitted by these base stations 110, 114. Position determination using OTDOA based on Reference Signal Time Difference (RSTD) measurements, for example, typically requires either synchronization of the transmission of these reference signals by the base stations 110, 114 or knowledge obtained in some other way of the Real Time Differences (RTDs) between pairs of base stations 110, 114. The LMF 120 typically has this knowledge, and thus, position determination in asynchronous networks based on measurements taken by the UE 105 of the various base stations 110, 114 can involve, for example, the LMF 120 determining the position of the UE 105 after receiving the measurements from the UE 105, or the UE 105 determining its own position after receiving RTD information from the LMF 120. In LTE networks, PRS reference signals can be used to make these RSTD measurements for OTDOA positioning.

Figure 2:
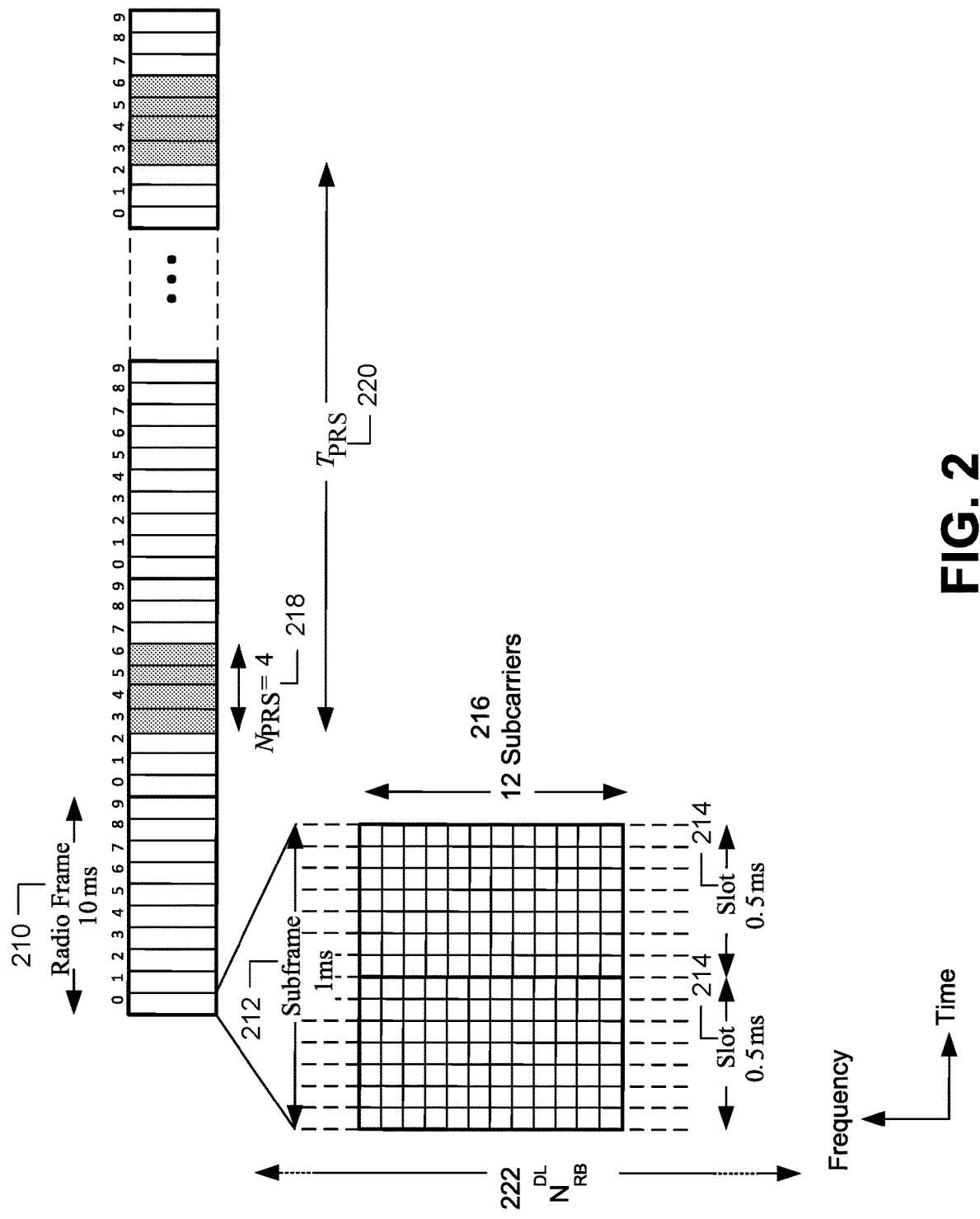
FIG. 2 is an illustration of the structure of an LTE subframe sequence with PRS positioning occasions, which may be similar to the frame/subframe structure used in 5G.

FIG. 2 is an illustration of the structure of an LTE subframe sequence with PRS positioning occasions, provided for reference. In FIG. 2, time is represented horizontally (e.g., on an X axis) with time increasing from left to right, while frequency is represented vertically (e.g., on a Y axis) with frequency increasing (or decreasing) from bottom to top, as illustrated. As shown in FIG. 2, downlink and uplink LTE Radio Frames 210 are of 10 ms duration each. For downlink Frequency Division Duplex (FDD) mode, Radio Frames 210 are organized into ten subframes 212 of 1 ms duration each. Each subframe 212 comprises two slots 214, each of 0.5 ms duration. In LTE, these radio frames 210 are transmitted by base stations similar to base stations 110, 114 of FIG. 1. PRS may be detected by any UE in the area and are therefore considered to be "broadcast" by these base stations.

In the frequency domain, the available bandwidth may be divided into uniformly spaced orthogonal subcarriers 216. For example, for a normal length cyclic prefix using 15 kHz spacing, subcarriers 216 may be grouped into a group of 12 subcarriers or "frequency bins." Each grouping, which comprises 12 subcarriers 216, in FIG. 2, is termed a "resource block" (or "physical resource block" (PRB)) and, in the example above, the number of subcarriers in the resource block may be written as $N_{SC}^{RB}=12$. For a given channel bandwidth, the number of available resource blocks on each channel 222, which is also called the transmission bandwidth configuration 222, is indicated as $N_{RB}^{DL}$ 222. For example, for a 3 MHz channel bandwidth in the above example, the number of available resource blocks on each channel 222 is given by $N_{RB}^{DL}=15$.

Resource blocks therefore can be described as a unit of frequency and time resources in radio frame 210, comprising one subframe 212 (two slots 214) and 12 subcarriers. Each slot 214 comprises 6 or 7 periods, or "symbols," during which a base station (for downlink (DL) radio frames) or UE (for uplink (UL) radio frames) may transmit radio frequency (RF) signals. Each 1 subcarrier×1 symbol cell in the 12×12 or 14×12 grid represents a "resource element" (RE), which is the smallest discrete part of the frame and contains a single complex value representing data from a physical channel or signal.

A PRS may be transmitted in special positioning subframes that are grouped into positioning "occasions." For example, in LTE, a PRS positioning occasion can comprise a number $N_{PRS}$ of consecutive positioning subframes 218 where the number $N_{PRS}$ may be between 1 and 160 (e.g., may include the values 1, 2, 4 and 6 as well as other values). The PRS positioning occasions for a cell supported by a base station may occur periodically at intervals 220, denoted by a number $T_{PRS}$, of millisecond (or subframe) intervals where $T_{PRS}$ may equal 5, 10, 20, 40, 80, 160, 320, 640, or 1280. As an example, FIG. 2 illustrates a periodicity of positioning occasions where $N_{PRS}$ equals 4 and $T_{PRS}$ is greater than or equal to 20. In some embodiments, $T_{PRS}$ may be measured in terms of the number of subframes between the start of consecutive positioning occasions.

PRS can be deployed with PRS configuration parameters (e.g., $N_{PRS}$, $T_{PRS}$, any muting and/or frequency hopping sequences, PRS ID, bandwidth, etc.), which may be provided, from a location server via a serving base station, to a UE. These PRS configuration parameters may vary from base station to base station, and may be set by a location server that provides these PRS configuration parameters to each base station.

A PRS for a given base station may be transmitted using a predetermined pattern of resource elements within a resource block. For a given subcarrier, this may mean the base station transmits the PRS using 1-2 symbols per slot. Problematically, however, if a base station uses the same symbols to transmit the PRS for each occasion, the PRS will be easily detectable once the symbols for each occasion are determined. As such, this is one aspect in which traditional reference signals, such as PRS, may be vulnerable to war-driving and/or crowd-sourcing efforts to determine the location of a base station.

Additionally, a PRS for a given base station may also be transmitted using a particular code. Code isolation is one of three layers of isolation used by PRS to improve the ability to distinguish between cells. (The other two are frequency and time isolation in which the resource elements of a resource block are allocated between various base stations to prevent base stations from attempting to use the same resource on it). In code isolation, each base station transmits a different PRS sequence, or "code," that is unique or semi-unique, enabling a UE to determine the base station from which a detected PRS was transmitted. But the allocation of static codes for each base station can be problematic. As with the use of static symbols for the transmission of a PRS, if a base station transmits the PRS with the same code for each occasion, the originating base station of a PRS will be easily determinable once the code determined. As such, this is another aspect in which traditional reference signals, such as PRS, may be vulnerable to war-driving and/or crowd-sourcing efforts to determine the location of a base station.

For the 5G standard, it is anticipated that radio frames will be similar to the structure for LTE illustrated in FIG. 2. However, certain characteristics (e.g., timing, available bandwidth, etc.) may vary. Additionally, the characteristics of a new position measurement signal to replace PRS may vary as well, to enable this new reference signal to provide accurate measurements, be robust to multipath, provide a high level of orthogonality and isolation among cells, and consume relatively low UE power, above and beyond the current characteristics of PRS.

To prevent the vulnerabilities of PRS discussed above, embodiments of a position measurement signal may further employ "symbol hopping" and/or "code hopping" between occasions, dynamically adjusting the symbols of a resource block with which the position measurement signal is transmitted and/or the code by which the position measurement signal is encoded, to help prevent unauthorized detection and utilization of the position measurement signal. Information that enables a UE to determine the pattern of symbol hopping and/or code hopping for a base station may be sent to authorized UEs by a location server (or obtained via some other authorization process) so that a UE is able to "listen for" a position measurement signal from the base station with the right symbol(s) and/or code for each occasion.

Figure 3A:
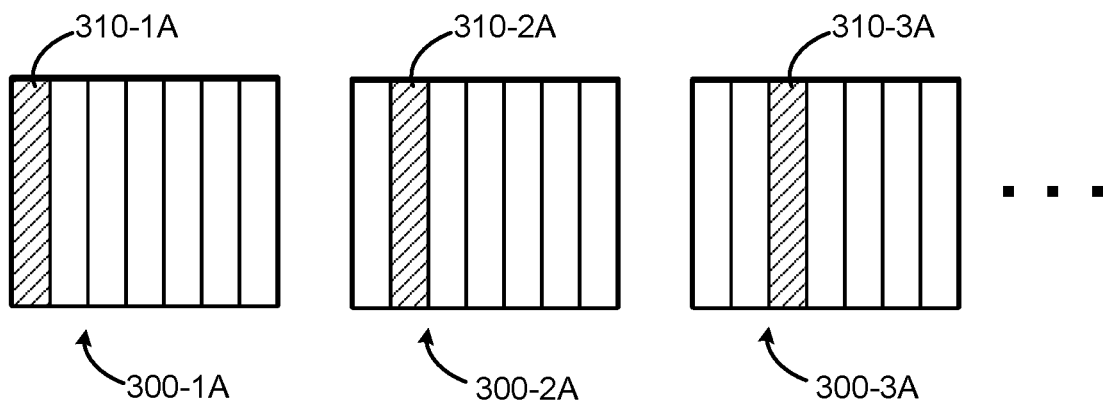
FIGS. 3A-3C are illustrations of how symbol hopping may be implemented in various embodiments.
Figure 3B:
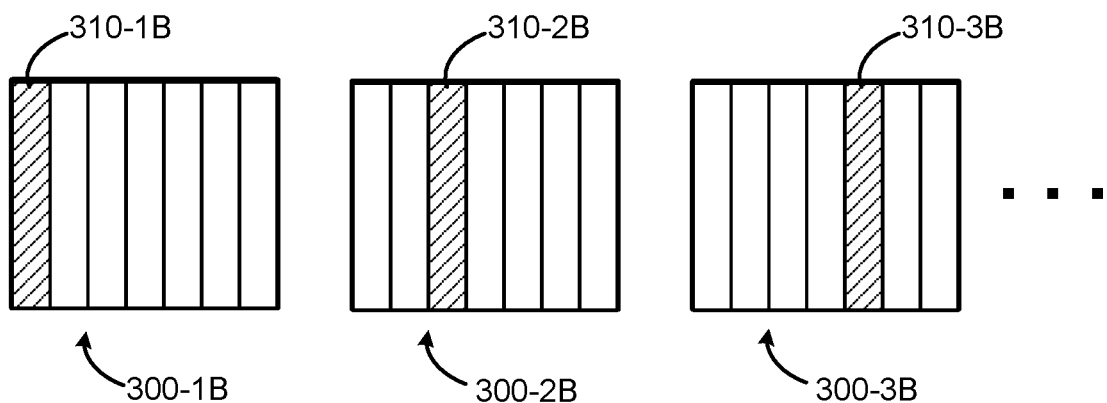
Figure 3C:
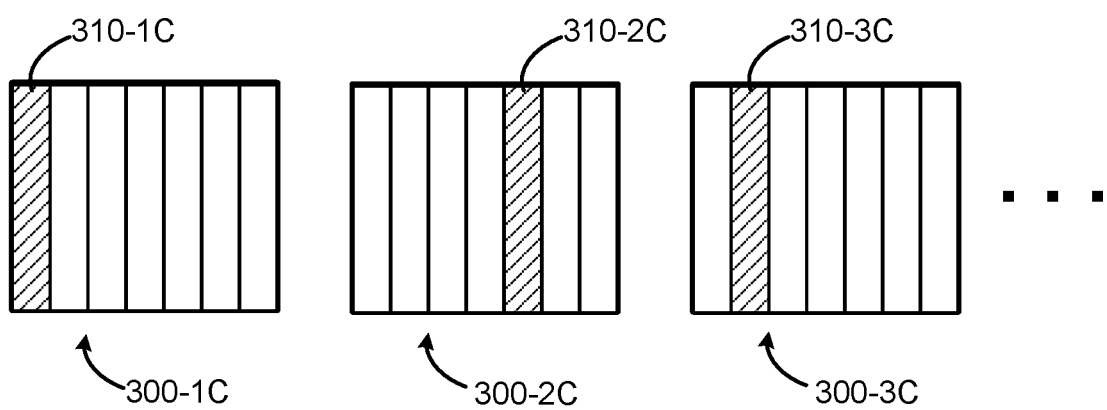

FIGS. 3A-3C are illustrations of how symbol hopping may be implemented in various embodiments. In FIG. 3A, representative slots (collectively and generically referred to herein as slots 300) are illustrated for three successive positioning occasions. Here, slots for first, second, and third positioning occasions are labeled as 300-1A, 300-2A, and 300-3A, respectively. (Of course, as illustrated in FIG. 2 there may be two slots per resource block, and many intervening slots between slots of different occasions. These additional slots are not illustrated. The position measurement signal may also be transmitted using additional subcarriers and/or using two or more symbols within a particular, but these variations are also not shown. As such, the slots 300 shown are illustrative of a larger set of slots and/or symbols used to transmit the position measurement signal.) Similar to the slots 214 of the resource block illustrated in FIG. 2, these slots each have seven symbols (illustrated as columns within the slot 300). Shaded symbols, 310-1A, 310-2A, and 310-3A represent symbols in which a position measurement signal is transmitted by a base station. FIGS. 3B and 3C also illustrate slots 300 that are labeled and shaded with the same convention.

As shown, the slots 300 of FIG. 3 illustrate how basic symbol hopping may be performed. In this example, the symbol 310-1A in which the position measurement signal is transmitted comprises the first symbol of slot 300-1A. In the second occasion, the symbol 310-2A in which the position measurement signal is transmitted comprises the second symbol of the slot 300-2A, and in the third occasion, the symbol 310-3A in which the position measurement signal is transmitted comprises the third symbol of the slot 300-3A. Thus, the position of the symbol with which the position measurement signal is transmitted within a slot advances by one (from first, to second, to third, and so on) for each successive positioning occasion.

In the example illustrated in FIG. 3B, the symbols, 310-1B, 310-2B, and 310-3B with which the position measurement signal is transmitted advances by two symbols per successive positioning occasion (from first, to third, to fifth, and so on). And in the example illustrated in FIG. 3C, the symbols, 310-1C, 310-2C, and 310-3C, with which the position measurement signal is transmitted advances by four symbols per successive positioning occasion. In this example, however, because there are only seven symbols per slot, the third slot 300-3C illustrates how the symbol 310-3C with which the position measurement signal is transmitted can "wraparound" the slot. Such wrapping around (treating the first symbol as the next symbol after the seventh) may occur for each occasion in which the symbol designated for transmission of the positioning measurement signal advances past the edge of the slot 300.

Thus, by transmitting in different symbols for different occasions, as illustrated in FIGS. 3A-3C, symbol hopping can be used to add a type of encryption to help guard against brute force attacks (e.g., via war-driving, crowd-sourcing, etc.). Moreover, different base stations may advance in a different manner. For instance, a first group of base stations may advance the manner illustrated in FIG. 3A, a second group in the manner illustrated in FIG. 3B, and a third group in the manner illustrated in FIG. 3C.

The determination of a symbol in the example shown in FIG. 3A-3C may be calculated using a basic equation where the position of the symbol used (e.g., $1^{st}$, $2^{nd}$, etc. position within a slot) is the previous position plus N (where N is the number of symbols to advance per occasion), modulo S (where S is the number of symbols per slot). In some embodiments, more advanced equations or pattern generation algorithms may be used, creating a pseudorandom pattern between occasions that may make it more difficult to reverse engineer the equation. In other embodiments, values may be maintained in one or more shift registers (e.g., Linear Feedback Shift Registers (LFSRs)) and/or other hardware circuitry to determine the symbol(s) of a slot during which the position measurement signal is transmitted.

In some embodiments, equations and/or other algorithms used for symbol hopping (including those implemented, at least in part, in hardware) may use the ID of the base station as a variable for input, enabling different output for different base stations. Authorized UEs may be given the equation (e.g., by a location server) to determine the pattern of symbol hopping for base stations within a cellular network.

Authorized UEs may also be given "seed information" to determine where, in a pattern provided by the equation, a given occasion lies. This information may be provided as a timestamp and initial state of the equation or algorithm. In the example of FIG. 3A, for instance, seed information may comprise a time at which the position measurement signal was transmitted in the first symbol of a slot, thereby enabling a UE to determine, based on the current time, a number of occasions between the timestamps in the current time, and thus, the symbol during which the position measurement signal is transmitted at a current time. In embodiments where a shift registers are used, seed information may comprise an initial value for the shift register, and an equation or other algorithm may be used to determine how to advance the shift registers.

Put more generally, "seed information" for symbol hopping may comprise a timestamp or similar reference to enable a UE to determine symbol transmissions for all future occasions using an equation or other pattern generator.

Code hopping can provide an additional layer of encryption. As indicated previously, position measurement signals may be encoded with a particular code that can enable a UE to identify a base station from which a particular position measurement signal was transmitted. Codes for use in position measurement signal transmission may be selected based on auto-correlation and/or cross-correlation properties that provide, among other things, favorable orthogonality between codes and a code space large enough (e.g., on the order of thousands of available codes or more) to provide a desired amount of security against brute force attacks.

Gold codes are used in LTE for PRS and CRS reference signals, and they may be used in position measurement signals in 5G as well. Gold codes cycle through a sequence of 2 billion ($2^{31}-1$), and may be generated using two length-31 linear feedback shift registers using known techniques, where one shift register includes known values in the other shift registers initialized with some seed value. That said, Zadoff-Chu and/or other codes may be used in position measurement signals addition or as an alternative to Gold codes.

Similar to the symbol hopping described above, code hopping can involve the use of an equation or other code generator to generate a code for encoding the position measurement signal, which may be proprietary and shared with authorized UEs, as needed, (e.g., sent by a location server). Moreover, codes may be individualized to a particular base station based on an identifier of the base station, and seed information for the equation or other code generator may be provided to a UE to enable the UE to determine the code for a current position measurement signal using the equation/code generator.

A code-hopping scheme may also apply Gold-codes to generate a pseudorandom sequence of identities assigned to a given cell. One embodiment would be to initialize the LFSRs with known seeds, advance the LFSRs some predetermined number of steps, extract some number of bits from the output sequence, and evaluate those bits as an identity number.

In one example of a code-hopping scheme, cell A may transmit a signal according to cell identity 1 in occasion 1 and a signal according to cell identity 1700 in occasion 2. An authorized UE with knowledge of the code-hopping sequence and its initial state would be able to associate a measurement with identity 1 in occasion 1 to cell A, and similarly associate a signal measured with identity 1700 in occasion 2 to cell A. Conversely, an unauthorized UE may be able to detect a signal with identity 1 in occasion 1 and identity 1700 in occasion 2 through brute-force, but wouldn't readily be able to associate those measurements to cell A. Without the association between a detected measurement and it transmission point, the measurement would be useless for the purpose of positioning.

Figure 4:
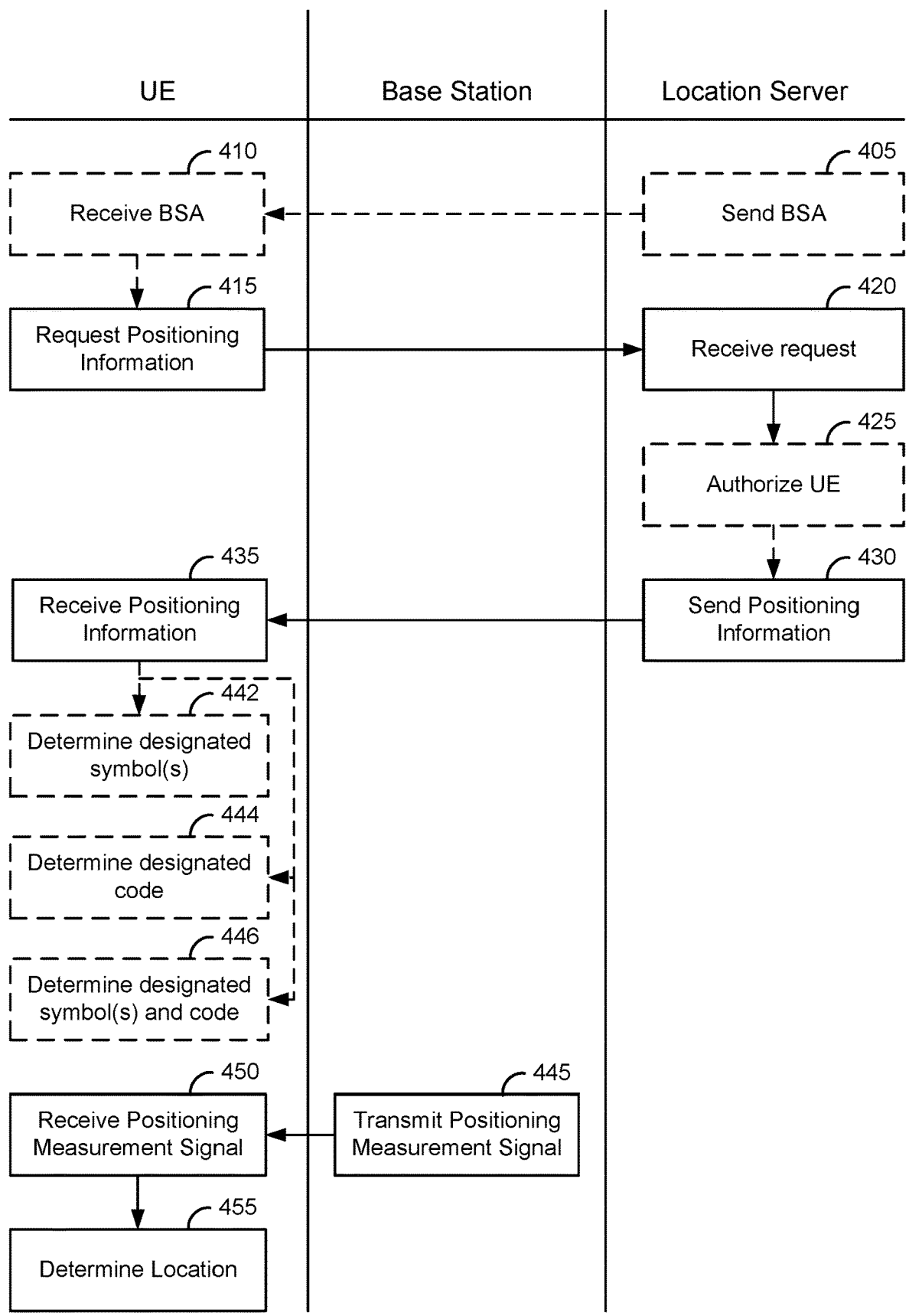
FIG. 4 is a swim-lane diagram illustrating the interaction between the location server, UE, and base station, according to embodiments.

FIG. 4 is a swim-lane diagram illustrating the interaction between the location server, UE, and base station, according to embodiments. The location server, UE and base station, may correspond to components illustrated in FIG. 1, such as the LMF 120, UE 105, and gNBs, respectively. (However, the interaction illustrated in FIG. 4 may take place in networks other than the communication network 100 of FIG. 1.) As a person of ordinary skill in the art will appreciate, alternative embodiments may combine, separate, rearrange the blocks illustrated, and/or alter the interaction in other ways.

The interaction may begin with the location server sending the BSA to the UE at block 405, which is received by the UE at block 410. As previously noted, the BSA can include location information for various base stations in a communication network to enable a location of the UE to be determined (e.g., via trilateration or triangulation, once distances or angles between the UE and at least a portion of the base stations are determined). As such, a BSA may include an identifier and coordinates for each of a plurality of base stations in the BSA, in some embodiments. Also, as noted above, some embodiments may include precautions (such as encryption of the BSA) to help ensure the contents of the BSA are protected.

In alternative embodiments, the BSA may be obtained by the UE via other sources and/or at other times. In some embodiments, for example, the BSA may be communicated to the UE during routine maintenance or updates of the UE. In some embodiments, the BSA may even be installed with other software during manufacture of the UE. The BSA may be encrypted when communicated and subsequently "unlocked" when the UE is authorized to use the BSA and given the key to decrypt the BSA. Depending on desired functionality, this process may be initiated by actions by different entities (e.g., a user of the UE, an application executed by the UE, the cellular carrier or other operator, etc.), for example.

In some embodiments, means for determining symbol hopping and/or code hopping by one or more base stations of the BSA may also be communicated to the UE by the location server at blocks 405 and 410. For instance, the location server may communicate an equation, pattern generator, code generator, and/or the like to the UE at the same time it communicates the BSA. (However, it may be communicated separately in alternative embodiments.) As noted previously, means for determining symbol hopping and/or code hopping may use identification information for a base station as well as seed information to determine a symbol and/or code the base station uses for positioning measurement signal transmissions for a given positioning occasion.

At block 415, the UE requests positioning information from the location server, and the request is received by the location server at block 420. Optionally, at block 425, the location server can authorize the UE, to ensure the UE has permission to access the positioning information. In such cases, the positioning information request sent by the UE may include an identifier of the UE and/or other information that may be used as authorization information to enable the location server to authorize the UE. In other instances, authorization may be made separately (e.g., during the initiation of a communication session between the UE and location server).

At block 430, the location server sends the positioning information to the UE, which receives it at block 435. Here, the positioning information may include seed information to enable the UE to do one of three things, depending on desired functionality. First, for instances where the base station engages in symbol hopping, the UE can determine the symbol(s) of a position determination signal transmitted by a base station at a given positioning occasion, as illustrated by block 442. Second, for instances where the base station engages in code hopping, the UE may determine the code of the position determination signal, as illustrated by block 444. Third, where both code hopping and symbol hopping are used, the UE may determine the designated symbol(s) and code of the position determination signal.

Depending on desired functionality, the positioning information may expire after a certain time period. That is, the seed information in the positioning information may enable the UE to determine the symbol(s) and/or code of a position determination signal transmitted by a base station at a given positioning occasion within a finite time period. After the time period, new seed information (or even a new equation or other algorithm) may be used for symbol hopping and/or code hopping, and this new information can be sent to authorized UEs. This functionality not only can help make the system more resilient against crowd-sourcing and/or war-driving attacks, but can enable an operator to employ a subscription-type model for the usage of the BSA, where UEs can periodically renew their license/access to positioning method provided by the transmission of the position measurement signals, if desired. At any rate, according to embodiments, the positioning information sent at block 430 and received at block 435 may enable the determination of the symbol and/or code for a plurality of occasions (thus, in these embodiments there is no need to send positioning information for every occasion).

At block 445 (and during the given occasion for which the determination at block 442, 444, or 446 was made), the base station transmits the positioning measurement signal using the designated symbol and/or code, which is received at block 450 by the UE, based on the determination made at block 442, 444, or 446. This may be one of several base stations that transmit positioning measurement signals that are received by the UE, thereby enabling the UE to determine its position based on known positions of the base stations, using common OTDOA techniques or underlying methods such as triangulation or trilateration.

Based on this information, the UE can determine its location, as illustrated at block 455. As previously indicated, the UE may be enabled to do so by storing a BSA locally with information about the locations of the base stations for which the UE has received positioning measurement signals. Additionally, or alternatively, the UE may obtain this information from a location server during a positioning session. A person of ordinary skill in the art will appreciate numerous ways in which the location may be determined at block 455.

Figure 5:
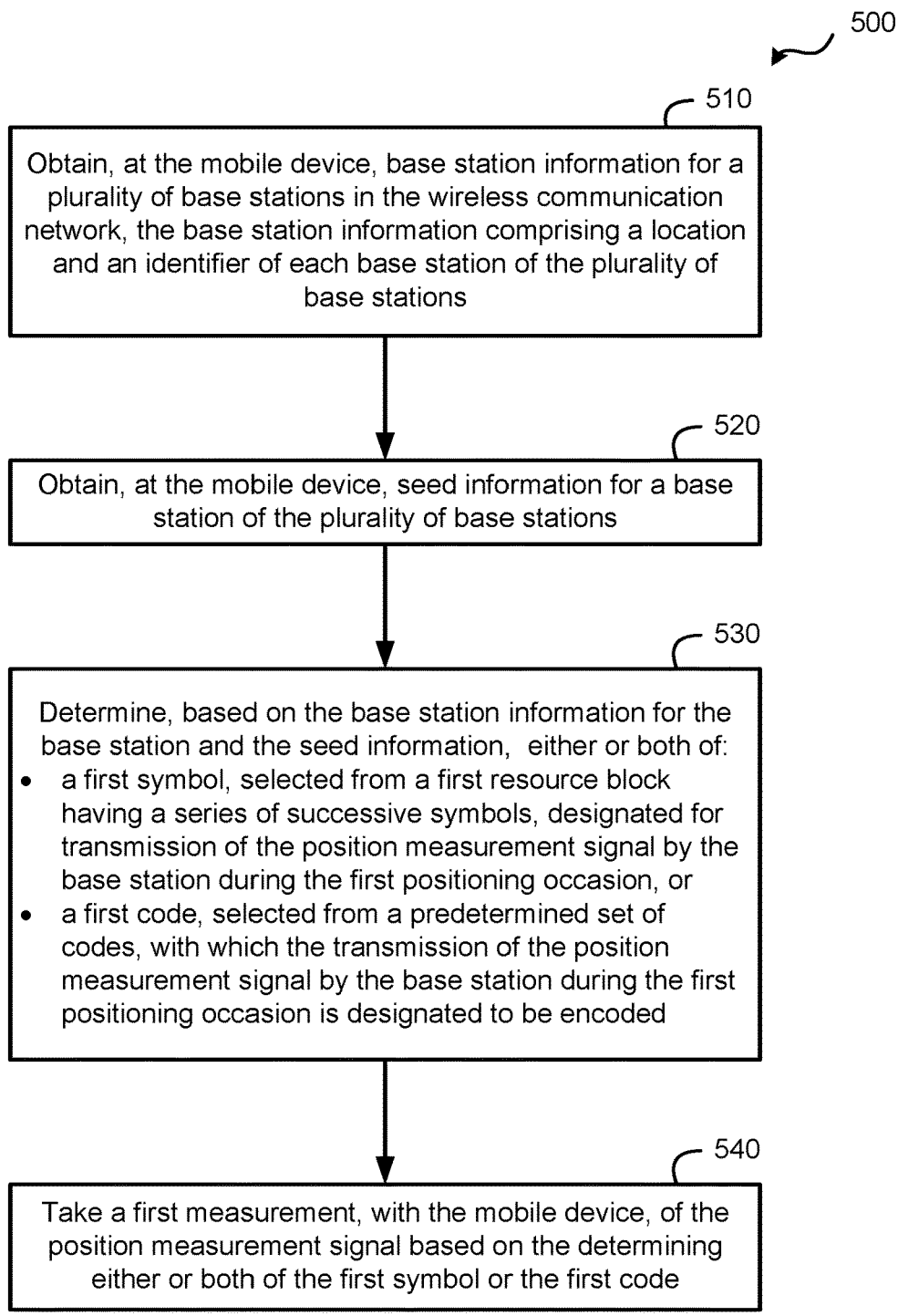
FIG. 5 is a flow diagram illustrating a method of obtaining reference signals with a mobile device in a wireless communication network, according to an embodiment.
Figure 7:
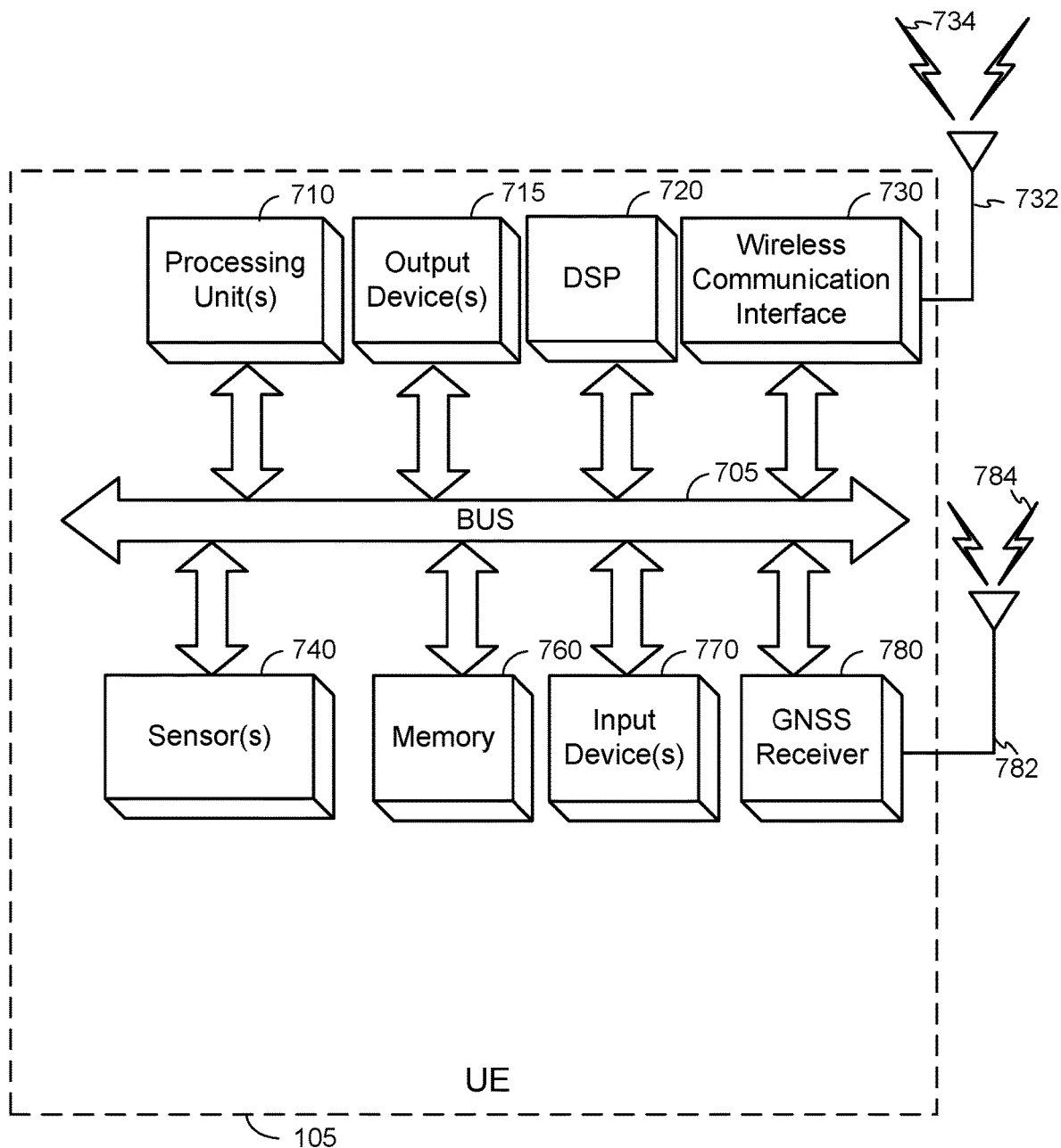
FIG. 7 is an embodiment of a UE.

FIG. 5 is a flow diagram illustrating a method 500 of obtaining reference signals with a mobile device in a wireless communication network, according to an embodiment, which illustrates the functionality of a UE according to aspects of embodiments described above and illustrated in FIGS. 1, 3, and 4. Means for performing the functionality of the blocks may include software and/or hardware components of a UE 105, as illustrated in FIG. 7 and described in more detail below.

At block 510, the functionality includes obtaining, at the mobile device, base station information for a plurality of base stations in the wireless communication network. The base station information comprises a location and an identifier of each base station of the plurality of base stations. As noted above, the base station information may comprise a BSA or similar collection of base station-related data, and may be provided to the mobile device in any of a variety of ways, including from a location server (e.g., via a cellular communication network, the Internet, or other means, by way of a serving base station, a Wi-Fi access point, or other information gateway), at manufacture (and subsequently unlocked, for example), and the like.

Means for performing the functionality at block 510 may comprise one or more components of a UE 105, such as a bus 705, processing unit(s) 710, wireless communication interface 730, memory 760, input device(s) 770, and/or other components of the UE 105 illustrated in FIG. 7 and described in more detail below.

At block 520, the functionality comprises obtaining, at the mobile device, seed information for a base station of the plurality of base stations. As noted previously, the UE may utilize the seed information into an equation or other algorithm to determine a symbol and/or code for the transmission of a position measurement signal for any given positioning occasion in a certain period of time (e.g., a subscription time.) or even indefinitely. In some embodiments, the seed information may comprise a timestamp indicative of a time for which symbol periods, codes, or both of at least a portion of wireless positioning measurement signals subsequently transmitted by a base station can be determined. Additionally, or alternatively, the seed information may comprise initial state information, which may vary, depending on the type of algorithm used for symbol hopping and/or code hopping (e.g., initial state information may comprise initial values for one or more shift registers, and initial code and/or symbol in a larger pattern, etc.). Depending on desired functionality, this information may be provided by a base station, or by other means (e.g., from the location server via the Internet, by way of a Wi-Fi access point). The seed information may come in a message that provides seed information for a plurality of base stations (e.g., all base stations in a BSA, all base stations within a certain distance of the UE's estimated position, etc.).

Means for performing the functionality at block 520 may comprise one or more components of a UE 105, such as a bus 705, processing unit(s) 710, wireless communication interface 730, memory 760, input device(s) 770, and/or other components of the UE 105 illustrated in FIG. 7 and described in more detail below.

At block 530, the functionality comprises determining, based on the base station information for the base station and the seed information, first information for a first positioning occasion. Here, the first information can comprise either or both of (1) a first symbol, selected from a first resource block having a series of successive symbols, designated for transmission of the position measurement signal by the base station during the first occasion, or (2) a first code, selected from a predetermined set of codes, with which the transmission of the position measurement signal by the base station during the first positioning occasion is designated to be encoded. In other words, the first information can allow a UE to perform the functionality illustrated in FIG. 4 by determining a designated symbol(s) (the functionality of block 442), a designated code (block 444), or both, a designated symbol(s) and code (block 446). Accordingly, where symbol hopping and/or code hopping occurs, a determination may be made as to which symbol and/or code will be used in a transmission of the position measurement signal by the base station during the first occasion. According to some embodiments, determining either or both of the first symbol or the first code can comprise inputting values into a Linear Feedback Shift Register based on the initial state information. Additionally, or alternatively, determining either or both of the first symbol or the first code, may comprise inputting data from the seed information into an equation and obtaining the either or both the first symbol, and the first code from the equation.

Means for performing the functionality at block 530 may comprise one or more components of a UE 105, such as a bus 705, processing unit(s) 710, memory 760, input device(s) 770, and/or other components of the UE 105 illustrated in FIG. 7 and described in more detail below.

At block 540, the functionality comprises, taking a first measurement, with the mobile device, of the position measurement signal based on the determining either or both of the first symbol or the first code. As previously indicated, the position measurement signal may be similar to a PRS or CRS signal in LTE, where RTD measurements can be made and used for OTDOA positioning.

Means for performing the functionality at block 540 may comprise one or more components of a UE 105, such as a bus 705, processing unit(s) 710, wireless communication interface 730, memory 760, input device(s) 770, and/or other components of the UE 105 illustrated in FIG. 7 and described in more detail below.

Depending on desired functionality, embodiments may include one or more additional features. Symbol hopping and/or code hopping by the base station may occur between a first and a second occasion. And thus, functionality may include determining, based on the identification information for the base station and the seed information, second positioning measurement signal information for a second positioning occasion, wherein the second positioning regiments signal information comprises either or both of (1) a second symbol, selected from a second resource block having a series of successive symbols, designated for transmission of the position measurement signal by the base station during the second occasion, or (2) a second code, selected from the predetermined set of codes, designated for the transmission of the position measurement signal by the base station during the second positioning occasion. A second measurement, may then be taken, with the mobile device, of the position measurement signal based on the determining either or both of the second symbol or second code. Here, as illustrated in FIGS. 3A-3C, a position of the second symbol within the resource block may be different than a position of the first symbol within the first resource block. Additionally or alternatively, the second code may be different than the first code. Where Linear Feedback Shift Registers are used, determining the second code may comprise shifting values of at least one Linear Feedback Shift Register a number of times. The amount of shifting may vary from base station to base station. As such, determining the number of times to shift the values of the at least one Linear Feedback Shift Register may be based on an identity of the base station. Additionally or alternatively, in some embodiments, the method may further comprise determining, with the mobile device, the number of times to shift the value of the at least one Linear Feedback Shift Register for each of a plurality of positioning occasions, where the number of times to shift the values of the at least one Linear Feedback Shift Register is different for at least two of the plurality of positioning occasions.

Figure 6:
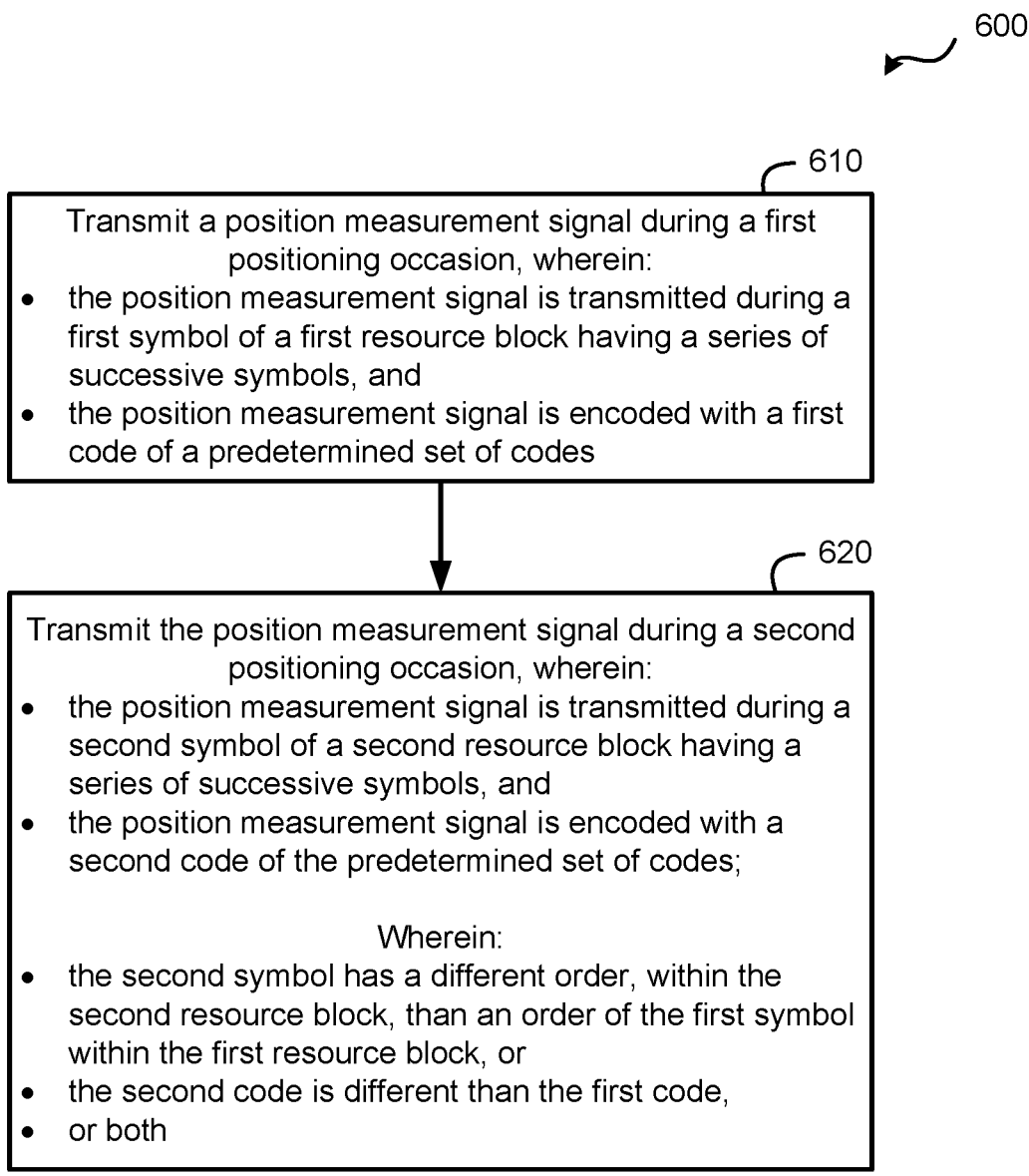
FIG. 6 is a flow diagram illustrating a method transmitting reference signals from a base station of a wireless communication network, according to an embodiment.

FIG. 6 is a flow diagram illustrating a method 600 transmitting reference signals from a base station of a wireless communication network, according to an embodiment. The functionality of one or more blocks illustrated in FIG. 5 may be performed by a base station (e.g., a gNB 110 and or ng-eNB 114, as illustrated in FIG. 1). Means for performing these functions may include software and/or hardware components as illustrated in FIG. 9 and described in more detail below.

At block 610, the functionality includes transmitting a position measurement signal during a first positioning occasion, where the position measurement signal is transmitted during a first symbol of a first resource block having a series of successive symbols, and the position measurement signal is encoded with a first code of a predetermined set of codes. Means for performing the functionality at block 610 may comprise, for example, bus 905, processing unit(s) 910, wireless communication interface 930, memory 960 (which may include software components), and/or other hardware and/or software components of a base station as illustrated in FIG. 9 and described in more detail below.

At block 620, the functionality comprises transmitting the position measurement signal during a second positioning occasion, where the position measurement signal is transmitted during a second symbol of a second resource block having a series of successive symbols, and the position measurement signal is encoded with a second signal of the predetermined set of codes. Here, the base station may engage in symbol hopping and/or code hopping between the first positioning occasion, and the second positioning occasion. Thus, the second symbol may have a different order, within the second resource block than an order of the first symbol within the first resource block, the second code may be different than the first code, or both.

Figure 9:
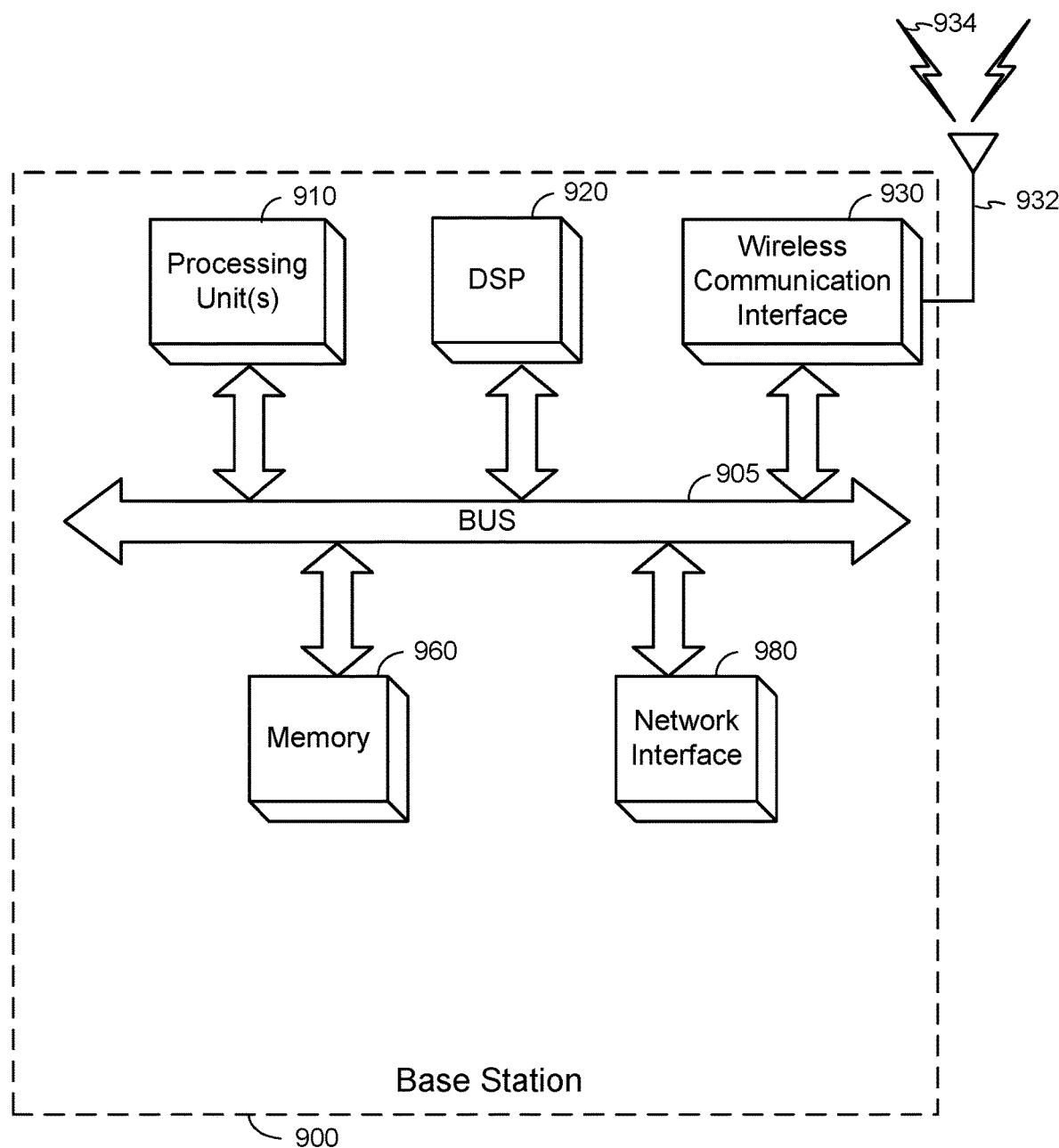
FIG. 9 is an embodiment of a base station.

Means for performing the functionality at block 610 may comprise, for example, bus 905, processing unit(s) 910, wireless communication interface 930, memory 960 (which may include software components), and/or other hardware and/or software components of a base station as illustrated in FIG. 9 and described in more detail below.

FIG. 7 illustrates an embodiment of a UE 105, which can be utilized as described herein above (e.g. in association with FIGS. 1-6). For example, the UE 105 can perform one or more of the functions of method 500 of FIG. 5. It should be noted that FIG. 7 is meant only to provide a generalized illustration of various components, any or all of which may be utilized as appropriate. It can be noted that, in some instances, components illustrated by FIG. 7 can be localized to a single physical device and/or distributed among various networked devices, which may be disposed at different physical locations (e.g., located at different parts of a user's body, in which case the components may be communicatively connected via a Personal Area Network (PAN) and/or other means).

The UE 105 is shown comprising hardware elements that can be electrically coupled via a bus 705 (or may otherwise be in communication, as appropriate). The hardware elements may include a processing unit(s) 710 which can include without limitation one or more general-purpose processors, one or more special-purpose processors (such as Digital Signal Processing (DSP) chips, graphics acceleration processors, Application Specific Integrated Circuits (ASICs), and/or the like), and/or other processing structure or means. As shown in FIG. 7, some embodiments may have a separate DSP 720, depending on desired functionality. Location determination and/or other determinations based on wireless communication may be provided in the processing unit(s) 710 and/or wireless communication interface 730 (discussed below). The UE 105 also can include one or more input devices 770, which can include without limitation a keyboard, touch screen, a touch pad, microphone, button(s), dial(s), switch(es), and/or the like; and one or more output devices 715, which can include without limitation a display, light emitting diode (LED), speakers, and/or the like.

The UE 105 might also include a wireless communication interface 730, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, cellular communication facilities, etc.), and/or the like, which may enable the UE 105 to communicate via the networks described above with regard to FIG. 1. The wireless communication interface 730 may permit data and signaling to be communicated (e.g. transmitted and received) with a network, eNBs, gNBs, ng-eNBs, and/or other network components, computer systems, and/or any other electronic devices described herein. The communication can be carried out via one or more wireless communication antenna(s) 732 that send and/or receive wireless signals 734.

Depending on desired functionality, the wireless communication interface 730 may comprise separate transceivers to communicate with base stations (e.g., ng-eNBs and gNBs) and other terrestrial transceivers, such as wireless devices and access points. The UE 105 may communicate with different data networks that may comprise various network types. For example, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more radio access technologies (RATs)

such as cdma2000, Wideband CDMA (WCDMA), and so on. Cdma2000 includes IS-95, IS-2000, and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from the Third Generation Partnership Project (3GPP). Cdma2000 is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 105 can further include sensor(s) 740. Sensors 740 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to complement and/or facilitate the position determination described herein.

Embodiments of the UE 105 may also include a GNSS receiver 780 capable of receiving signals 784 from one or more GNSS satellites (e.g., SVs 190) using an antenna 782 (which could be the same as antenna 732). Positioning based on GNSS signal measurement can be utilized to complement and/or incorporate the techniques described herein. The GNSS receiver 780 can extract a position of the UE 105, using conventional techniques, from GNSS SVs of a GNSS system, such as Global Positioning System (GPS), Galileo, Glonass, Quasi-Zenith Satellite System (QZSS) over Japan, Indian Regional Navigational Satellite System (IRNSS) over India, Beidou over China, and/or the like. Moreover, the GNSS receiver 780 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

The UE 105 may further include and/or be in communication with a memory 760. The memory 760 can include, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The memory 760 of the UE 105 also can comprise software elements (not shown in FIG. 7), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 760 that are executable by the UE 105 (and/or processing unit(s) 710 or DSP 720 within UE 105). In an aspect, then, such code and/or instructions can be used to configure and/or adapt a general purpose computer (or other device) to perform one or more operations in accordance with the described methods.

Figure 8:
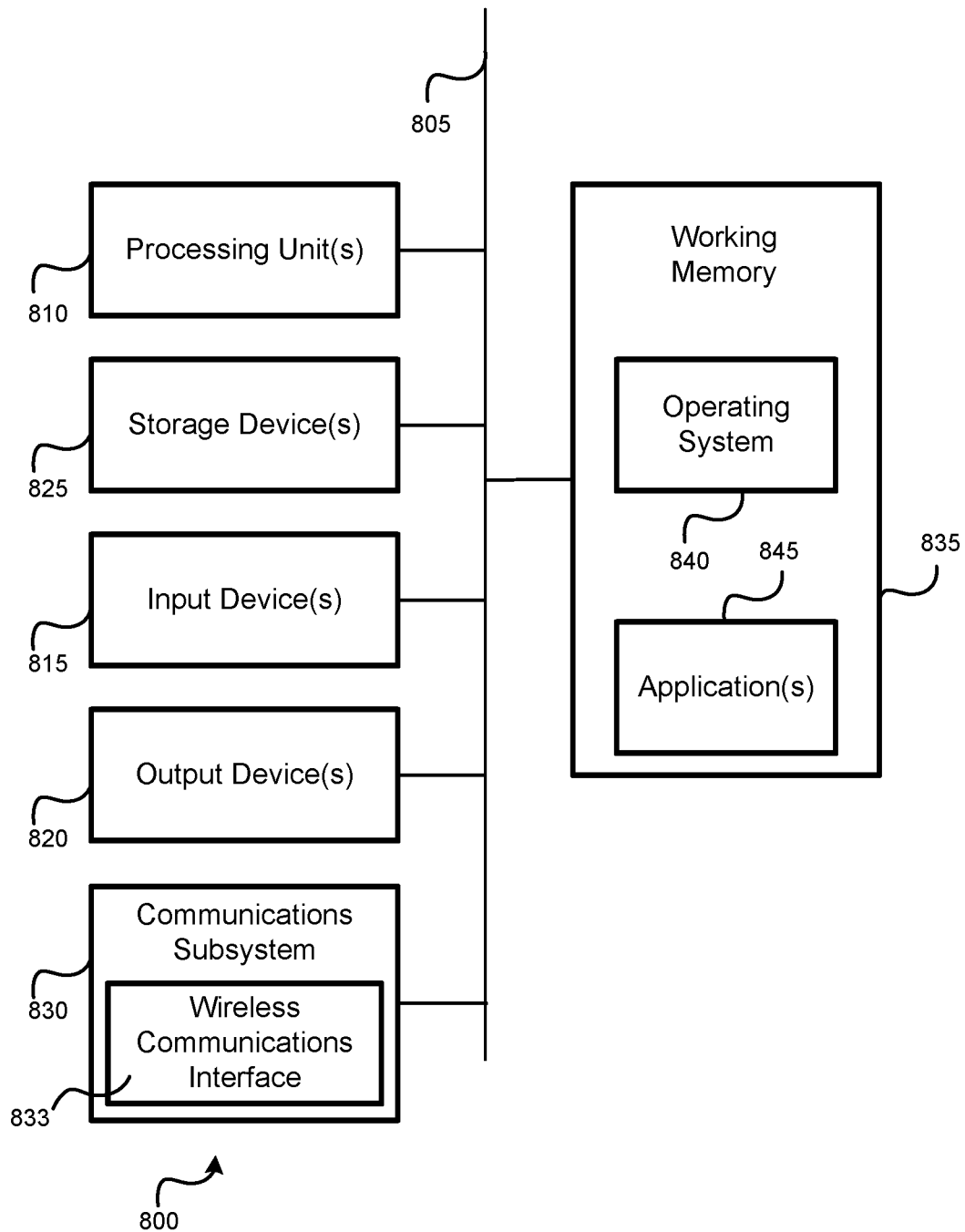
FIG. 8 is an embodiment of a communication network server.

FIG. 8 illustrates an embodiment of a communication network server 800, which may be utilized and/or incorporated into one or more components of a communication system (e.g., communication system 100 of FIG. 1), including various components of a 5G network, such as the NG-RAN 135 and 5GC 140, and/or similar components of other network types. FIG. 8 provides a schematic illustration of one embodiment of a communication network server 800 that can perform the methods provided by various other embodiments, such as the method described in relation to FIG. 6. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner. In addition, it can be noted that components illustrated by FIG. 8 can be localized to a single device and/or distributed among various networked devices, which may be disposed at different physical or geographical locations. In some embodiments, the communication network server 800 may correspond to an LMF 120, an E-SMLC, a SUPL Location Platform (SLP) and/or some other type of location-capable device.

The communication network server 800 is shown comprising hardware elements that can be electrically coupled via a bus 805 (or may otherwise be in communication, as appropriate). The hardware elements may include processing unit(s) 810, which can include without limitation one or more general-purpose processors, one or more special-purpose processors (such as digital signal processing chips, graphics acceleration processors, and/or the like), and/or other processing structure, which can be configured to perform one or more of the methods described herein, including the method described in relation to FIG. 6. The communication network server 800 also can include one or more input devices 815, which can include without limitation a mouse, a keyboard, a camera, a microphone, and/or the like; and one or more output devices 820, which can include without limitation a display device, a printer, and/or the like.

The communication network server 800 may further include (and/or be in communication with) one or more non-transitory storage devices 825, which can comprise, without limitation, local and/or network accessible storage, and/or can include, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like.

The communication network server 800 may also include a communications subsystem 830, which can include support of wireline communication technologies and/or wireless communication technologies (in some embodiments) managed and controlled by a wireless communication interface 833. The communications subsystem 830 may include a modem, a network card (wireless or wired), an infrared communication device, a wireless communication device, and/or a chipset, and/or the like. The communications subsystem 830 may include one or more input and/or output communication interfaces, such as the wireless communication interface 833, to permit data and signaling to be exchanged with a network, mobile devices, other communication network servers, computer systems, and/or any other electronic devices described herein. Note that the terms "mobile device" and "UE" are used interchangeably herein.

In many embodiments, the communication network server 800 will further comprise a working memory 835, which can include a RAM and/or or ROM device. Software elements, shown as being located within the working memory 835, can include an operating system 840, device drivers, executable libraries, and/or other code, such as application(s) 845, which may comprise computer programs provided by various embodiments, and/or may be designed to implement methods, and/or configure systems, provided by other embodiments, as described herein. Merely by way of example, one or more procedures described with respect to the method(s) discussed above, such as the method described in relation to FIG. 6, may be implemented as code and/or instructions that are stored (e.g. temporarily) in working memory 835 and are executable by a computer (and/or a processing unit within a computer such as processing unit(s) 810); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 825 described above. In some cases, the storage medium might be incorporated within a communication network server, such as communication network server 800. In other embodiments, the storage medium might be separate from a communication network server (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the communication network server 800 and/or might take the form of source and/or installable code, which, upon compilation and/or installation on the communication network server 800 (e.g., using any of a variety of generally available compilers, installation programs, compression/decompression utilities, etc.), then takes the form of executable code.

FIG. 9 illustrates an embodiment of a base station 900, which can be utilized as described herein above (e.g. in association with FIGS. 1-6). For example, the base station 900 can perform one or more of the functions of method 600 of FIG. 6. It should be noted that FIG. 9 is meant only to provide a generalized illustration of various components, any or all of which may be utilized as appropriate. In some embodiments, the base station 900 may correspond to an LMF 120, a gNB 110, an ng-eNB 114 as described herein above.

The base station 900 is shown comprising hardware elements that can be electrically coupled via a bus 905 (or may otherwise be in communication, as appropriate). The hardware elements may include a processing unit(s) 910 which can include without limitation one or more general-purpose processors, one or more special-purpose processors (such DSP chips, graphics acceleration processors, ASICs, and/or the like), and/or other processing structure or means. As shown in FIG. 9, some embodiments may have a separate DSP 920, depending on desired functionality. Location determination and/or other determinations based on wireless communication may be provided in the processing unit(s) 910 and/or wireless communication interface 930 (discussed below). The base station 900 also can include one or more input devices 970, which can include without limitation a keyboard, display, mouse, microphone, button(s), dial(s), switch(es), and/or the like; and one or more output devices 915, which can include without limitation a display, LED, speakers, and/or the like.

The base station 900 might also include a wireless communication interface 930, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, cellular communication facilities, etc.), and/or the like, which may enable the base station 900 to communicate as described herein. The wireless communication interface 930 may permit data and signaling to be communicated (e.g. transmitted and received) UEs, other base stations (e.g., eNBs, gNBs, and ng-eNBs), and/or other network components, computer systems, and/or any other electronic devices described herein. The communication can be carried out via one or more wireless communication antenna(s) 932 that send and/or receive wireless signals 934.

The base station 900 may also include a network interface 980, which can include support of wireline communication technologies. The network interface 980 may include a modem, network card, chipset, and/or the like. The network interface 980 may include one or more input and/or output communication interfaces to permit data to be exchanged with a network, communication network servers, computer systems, and/or any other electronic devices described herein.

In many embodiments, the base station 900 will further comprise a memory 960. The memory 760 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 960 of the base station 900 also can comprise software elements (not shown in FIG. 9), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 960 that are executable by the base station 900 (and/or processing unit(s) 910 or DSP 920 within base station 900). In an aspect, then, such code and/or instructions can be used to configure and/or adapt a general purpose computer (or other device) to perform one or more operations in accordance with the described methods.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

What is claimed is:

1. A method of obtaining reference signals with a mobile device in a wireless communication network, the method comprising:
    obtaining, at the mobile device, base station information for a plurality of base stations in the wireless communication network, the base station information comprising a location and an identifier of each base station of the plurality of base stations;
    obtaining, with a mobile device, seed information for a base station of the plurality of base stations;
    determining, based on the base station information for the base station and the seed information, a first code, selected from a predetermined set of codes, with which a broadcast of a position measurement signal by the base station during a first positioning occasion is designated to be encoded; and
    taking a first measurement, with the mobile device, of the position measurement signal based on the determining the first code.

2. The method of claim 1, wherein the seed information comprises a timestamp indicative of a time for which codes of at least a portion of wireless positioning measurement signals subsequently broadcast by the base station can be determined.

3. The method of claim 1, wherein obtaining the seed information comprises receiving the seed information from the base station.

4. The method of claim 1, wherein the seed information comprises initial state information.

5. The method of claim 4, wherein the determining the first code comprises inputting values into a Linear Feedback Shift Register based on the initial state information.

6. The method of claim 1, wherein the determining the first code comprises inputting data from the seed information into an equation and obtaining the first code from the equation.

7. The method of claim 1, further comprising:
    determining, based on the base station information for the base station and the seed information, a second code, selected from the predetermined set of codes, designated for a broadcast of a position measurement signal by the base station during a second positioning occasion; and
    taking a second measurement, with the mobile device, of the position measurement signal based on the determining the second code.

8. The method of claim 7, wherein the second code is different than the first code.

9. The method of claim 7, wherein determining the second code comprises shifting values of at least one Linear Feedback Shift Register a number of times.

10. The method of claim 9, further comprising determining the number of times to shift the values of the at least one Linear Feedback Shift Register based on an identity of the base station.

11. The method of claim 9, further comprising determining, with the mobile device, the number of times to shift the values of the at least one Linear Feedback Shift Register for each of a plurality of positioning occasions, wherein the number of times to shift the values of the at least one Linear Feedback Shift Register is different for at least two of the plurality of positioning occasions.

12. A device comprising:
a wireless communication interface;
a memory; and
a processing unit communicatively coupled with the wireless communication interface and the memory and configured to:
obtain base station information for a plurality of base stations in a wireless communication network, the base station information comprising a location and an identifier of each base station of the plurality of base stations;
obtain seed information for a base station of the plurality of base stations;
determine, based on the base station information for the base station and the seed information, a first code, selected from a predetermined set of codes, with which a broadcast of a position measurement signal by the base station during a first positioning occasion is designated to be encoded; and
take a first measurement, using the wireless communication interface, of the position measurement signal based on the determining the first code.

13. The device of claim 12, wherein the processing unit is configured to obtain, from the seed information, a timestamp indicative of a time for which codes of at least a portion of wireless positioning measurement signals subsequently broadcast by the base station can be determined.

14. The device of claim 12, wherein the processing unit is configured to obtain the seed information at least in part by receiving the seed information from the base station.

15. The device of claim 12, wherein the processing unit is configured to determine, using the seed information, initial state information.

16. The device of claim 15, wherein the processing unit is configured to determine the first code at least in part by inputting values into a Linear Feedback Shift Register based on the initial state information.

17. The device of claim 12, wherein the processing unit is configured to determine the first code at least in part by inputting data from the seed information into an equation and obtaining the first code from the equation.

18. The device of claim 12, wherein the processing unit is further configured to:
determine, based on the base station information for the base station and the seed information, a second code, selected from the predetermined set of codes, designated for a broadcast of a position measurement signal by the base station during a second positioning occasion; and
take a second measurement, using the wireless communication interface, of the position measurement signal based on the determining the second code.

19. The device of claim 18, wherein the processing unit is configured to determine the second code at least in part by shifting values of at least one Linear Feedback Shift Register a number of times.

20. The device of claim 19, wherein the processing unit is further configured to determine the number of times to shift the values of the at least one Linear Feedback Shift Register based on an identity of the base station.

21. The device of claim 19, wherein the processing unit is further configured to determine the number of times to shift the values of the at least one Linear Feedback Shift Register for each of a plurality of positioning occasions, wherein the number of times to shift the values of the at least one Linear Feedback Shift Register is different for at least two of the plurality of positioning occasions.

22. A mobile device comprising:
means for obtaining base station information for a plurality of base stations in a wireless communication network, the base station information comprising a location and an identifier of each base station of the plurality of base stations;
means for obtaining seed information for a base station of the plurality of base stations;
means for determining, based on the base station information for the base station and the seed information a first code, selected from a predetermined set of codes, with which a broadcast of a position measurement signal by the base station during a first positioning occasion is designated to be encoded; and
means for taking a first measurement of the position measurement signal based on the determining the first code.

23. The device of claim 22, wherein the means for obtaining the seed information comprises means for receiving the seed information from the base station.

24. The device of claim 22, wherein the means for determining the first code comprises means for inputting values into a Linear Feedback Shift Register based on initial state information determined using the seed information.

25. The device of claim 22, wherein the means for determining the first code comprises means for inputting data from the seed information into an equation and obtaining the first code from the equation.

26. The device of claim 22, further comprising:
means for determining, based on the base station information for the base station and the seed information, a second code, selected from the predetermined set of codes, designated for a broadcast of the position measurement signal by the base station during a second positioning occasion; and
means for taking a second measurement, with the mobile device, of the position measurement signal based on the determining the second code.

27. The device of claim 26, wherein the means for determining the second code comprises means for shifting values of at least one Linear Feedback Shift Register a number of times.

28. The device of claim 27, further comprising means for determining the number of times to shift the values of the at least one Linear Feedback Shift Register based on an identity of the base station.

29. The device of claim 27, further comprising means for determining the number of times to shift the values of the at least one Linear Feedback Shift Register for each of a plurality of positioning occasions, wherein the number of times to shift the values of the at least one Linear Feedback Shift Register is different for at least two of the plurality of positioning occasions.

30. A non-transitory, computer-readable medium having instructions embedded thereon for causing a mobile device to obtain reference signals a wireless communication network, the instructions including computer code for:
obtaining base station information for a plurality of base stations in the wireless communication network, the base station information comprising a location and an identifier of each base station of the plurality of base stations;

obtaining seed information for a base station of the plurality of base stations;

determining, based on the base station information for the base station and the seed information, a first code, selected from a predetermined set of codes, with which a broadcast of a position measurement signal by the base station during a first positioning occasion is designated to be encoded; and taking a first measurement of the position measurement signal based on the determining the first code.

31. A method of broadcasting reference signals from a base station of a wireless communication network, the method comprising:

broadcasting a position measurement signal during a first positioning occasion, wherein the position measurement signal is encoded with a first code of a predetermined set of codes; and broadcasting the position measurement signal during a second positioning occasion, wherein the position measurement signal is encoded with a second code of the predetermined set of codes;

wherein the second code is different than the first code.

32. A base station comprising:

a wireless communication interface;

a memory; and a processing unit communicatively coupled with the wireless communication interface and the memory and configured to:

broadcast a position measurement signal, using the wireless communication interface, during a first positioning occasion, wherein the position measurement signal is encoded with a first code of a predetermined set of codes; and broadcast the position measurement signal, using the wireless communication interface, during a second positioning occasion, wherein the position measurement signal is encoded with a second code of the predetermined set of codes;

wherein the second code is different than the first code.

33. A device comprising:

means for broadcasting a position measurement signal during a first positioning occasion, wherein the position measurement signal is encoded with a first code of a predetermined set of codes; and means for broadcasting the position measurement signal during a second positioning occasion, wherein the position measurement signal is encoded with a second code of the predetermined set of codes;

wherein the second code is different than the first code.

34. A non-transitory, computer-readable medium having instructions embedded thereon for causing a base station of a wireless communication network to broadcast reference signals, the instructions including computer code for:

broadcasting a position measurement signal during a first positioning occasion, wherein the position measurement signal is encoded with a first code of a predetermined set of codes; and broadcasting the position measurement signal during a second positioning occasion, wherein the position measurement signal is encoded with a second code of the predetermined set of codes;

wherein the second code is different than the first code.

* * * * *